United States Patent [19]
Zirbes

[11] Patent Number: 5,956,885
[45] Date of Patent: Sep. 28, 1999

[54] FISHING REEL COVER

[76] Inventor: Michael L. Zirbes, 6900 Ximines Lane North, Maple Grove, Minn. 55369

[21] Appl. No.: 09/009,031

[22] Filed: Jan. 20, 1998

Related U.S. Application Data

[60] Provisional application No. 60/049,709, Jun. 16, 1997.

[51] Int. Cl.⁶ .................................................. A01K 97/08
[52] U.S. Cl. ............................................................. 43/26
[58] Field of Search .................................. 43/25, 26, 25.2, 43/4; 242/323; 206/315.11, 400, 316.2; D3/268, 267; 396/27; 428/131

[56] References Cited

U.S. PATENT DOCUMENTS

| | | | |
|---|---|---|---|
| D. 339,034 | 9/1993 | Walcott et al. | D7/607 |
| D. 340,576 | 10/1993 | Delagarza et al. | D3/38 |
| D. 366,759 | 2/1996 | Christensen | D3/260 |
| D. 394,155 | 5/1998 | Miyahara | D3/267 |
| 872,411 | 12/1907 | Greenawalt | 43/4 |
| 1,876,993 | 9/1932 | Manning . | |
| 2,532,119 | 11/1950 | Reynolds | 206/1 |
| 2,618,880 | 11/1952 | Sourek | 43/26 |
| 3,738,529 | 6/1973 | Rose | 220/85 H |
| 3,762,592 | 10/1973 | Mayes | 220/4 |
| 4,136,478 | 1/1979 | Wycosky | 43/26 |
| 4,176,701 | 12/1979 | Welgan | 150/52 |
| 4,332,846 | 6/1982 | Fischer et al. | 428/131 |
| 4,546,877 | 10/1985 | Evans | 206/315.11 |
| 4,641,454 | 2/1987 | Ray et al. | 43/26 |
| 4,645,076 | 2/1987 | Mock | 206/400 |
| 4,726,141 | 2/1988 | McBride et al. | 43/26 |
| 4,727,675 | 3/1988 | Huntt | 43/25 |
| 4,876,819 | 10/1989 | Clifford | 43/26 |
| 4,946,034 | 8/1990 | Matsubara | 206/315.11 |
| 4,957,246 | 9/1990 | Kantor | 242/55.53 |
| 5,133,171 | 7/1992 | Chase et al. | 53/409 |
| 5,199,563 | 4/1993 | Goodman | 206/316.2 |
| 5,318,821 | 6/1994 | Bradley, Jr. | 428/100 |
| 5,501,029 | 3/1996 | McDaniel, Sr. | 43/26 |
| 5,740,940 | 4/1998 | Weiss | 220/412 |

Primary Examiner—Michael J. Carone
Assistant Examiner—Fredrick T. French, III
Attorney, Agent, or Firm—Michael S. Sherrill

[57] ABSTRACT

A generally cylindrical, reusable fishing reel cover of clamshell design operable in the open position to allow the cover to be positioned around a fishing reel while the reel is still attached to a fishing rod, and operable in the closed position to completely surround the reel while allowing the crank and any attached fishing line to pass through the cover.

9 Claims, 4 Drawing Sheets

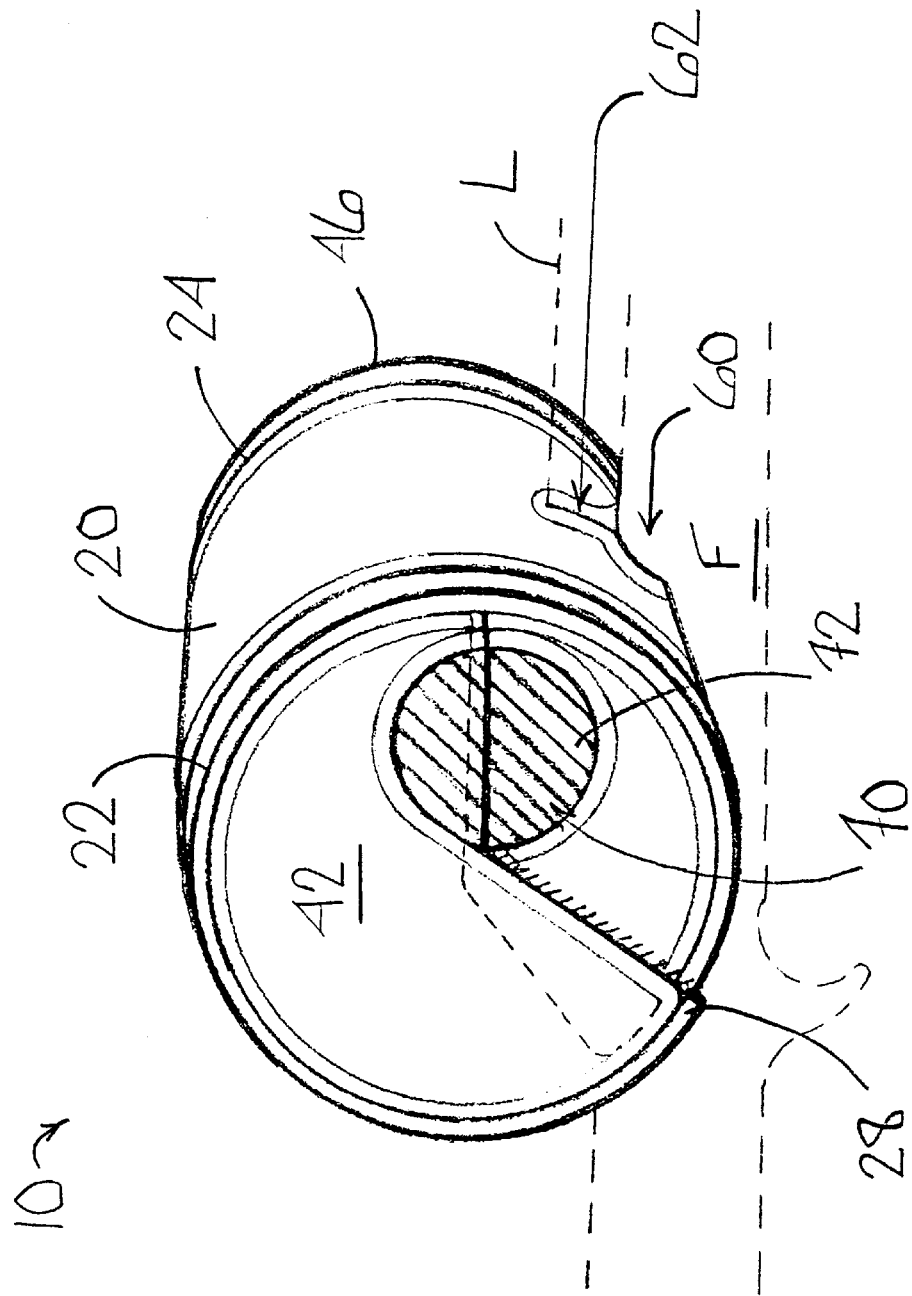

FISHING REEL COVER

This is a nonprovisional of provisional application Ser. No. 60/049,709, filed Jun. 16, 1997.

FIELD OF THE INVENTION

This invention relates to protective covers for fishing reels.

BACKGROUND OF THE INVENTION

As fishing reels have become more sophisticated and technologically advanced, the cost of such reels have increased. Hence, fisherman have become increasingly concerned about protecting such reels from mechanical damage and the damage caused by continuous exposure to the elements (i.e., salt water, sand, rain, ultraviolet light, etc).

U.S. Pat. No. 4,726,141, issued to McBride et al., discloses a relatively bulky and expensive carrying case for assembled fishing rods and reels. The carrying case includes a pair of open ended, pouches connected along an extended midseam, with each pouch sized to accommodate the entire proximal end of a rod and reel assembly. The top of each pouch is equipped with a zipper and the front of each pouch equipped with Velcro® for closing the pouch after insertion of a rod and reel. The pouches include oppositely oriented handles for facilitating carrying of the case.

U.S. Pat. No. 5,501,029, issued to McDaniel, discloses several different fishing reel covers. The fishing reel covers disclosed in McDaniel provide only partial coverage of the fishing reel (i.e., covering only the perimeter of the fishing reel between the side members) except for the embodiment depicted in FIGS. 12 and 13. It is noted that use of the embodiment depicted in FIGS. 12 and 13 would require substantial time, force and dexterity as a fishing reel can only be inserted within the cover by pulling the tabs (3.35, 3.37) apart, against the stabilizing effect of the first cap means (3.59), so as to create an opening from the channel (unnumbered) in the body member (3.32) and the slot (3.63) in the first cap means sufficient to permit the fishing reel cover to be slid sideways onto the fishing reel through the opening.

Accordingly, a substantial need exists for a low cost, easy to use protective fishing reel cover capable of completely surrounding and protecting the fishing reel.

SUMMARY OF THE INVENTION

The invention is a reusable fishing reel cover of clamshell design, comprising (i) a generally cylindrical main body slit along the longitudinal length of the body so as to define first and second ends capable of peripheral movement relative to one another, (ii) a first endcap peripherally attached to a first side edge of the main body and having a radially extending slot aligned with the longitudinal slit in the main body, (iii) a second endcap peripherally attached to a second side edge of the main body and having a radially extending slot aligned with the longitudinal slit in the main body, and (iv) a means for releasably securing the first and second ends of the main body together (e.g., Velcro®). The longitudinal slit and radial slots cooperate to allow the first and second ends of the main body to move peripherally relative to one another as between an open position with the first and second ends peripherally separated for allowing introduction of a fishing reel into the chamber, and a closed position with the first and second ends peripherally proximate one another and attached by the attaching means so as to be effective for protectively surrounding a fishing reel retained within the chamber.

BRIEF DESCRIPTION OF THE DRAWINGS

FIG. 7 is a perspective front and side view of a fourth embodiment of the fishing reel cover.

DESCRIPTION OF THE PREFERRED EMBODIMENTS INCLUDING A BEST MODE

Figure 1:
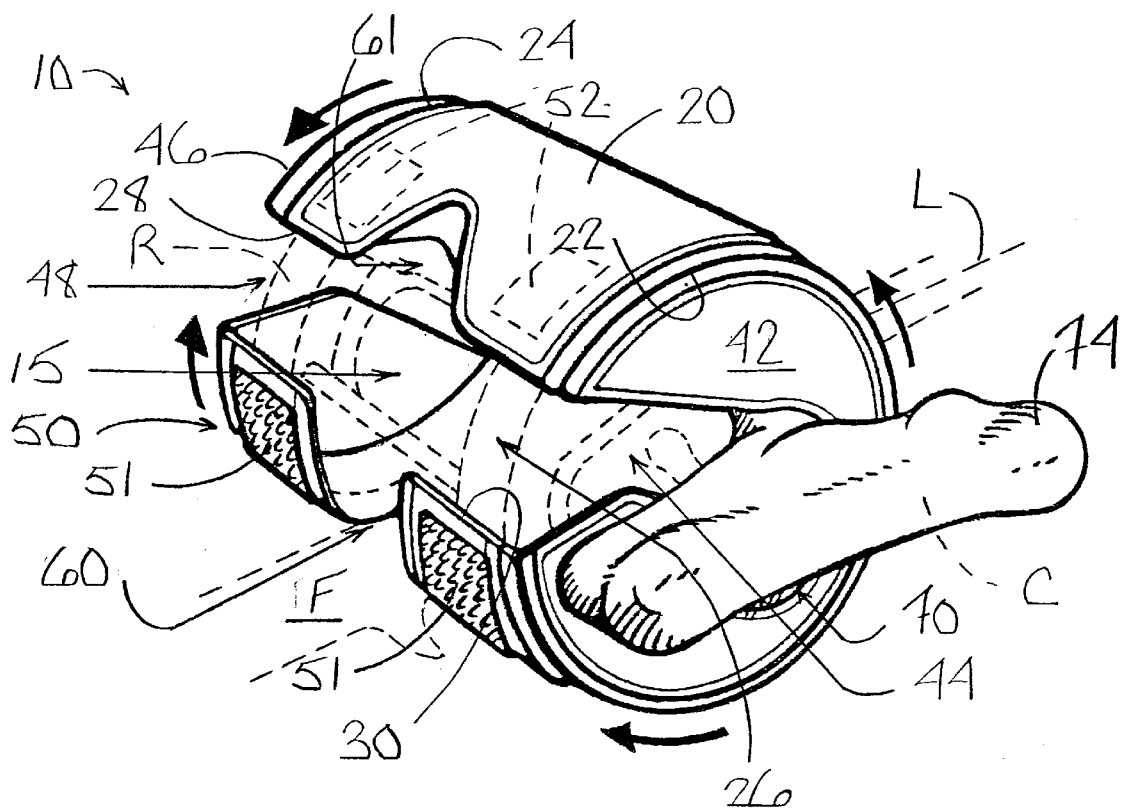
FIG. 1 is a perspective view of one embodiment of the fishing reel cover surrounding a bait casting fishing reel fastened to a fishing rod.
Figure 2:
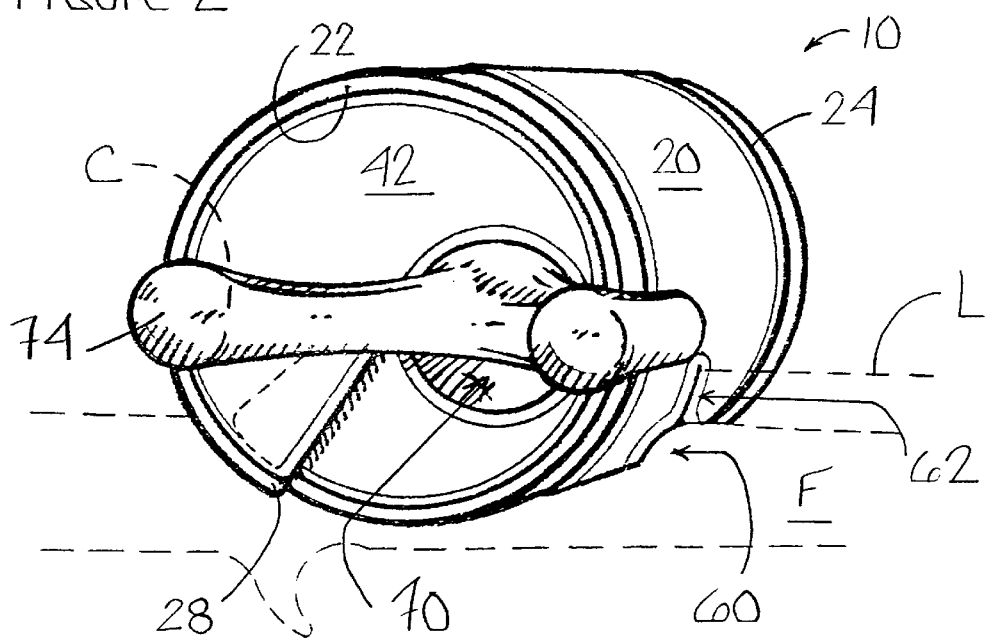
FIG. 2 is a perspective front and side view of a second embodiment of the fishing reel cover surrounding a bait casting fishing reel fastened to a fishing rod.
Figure 3:
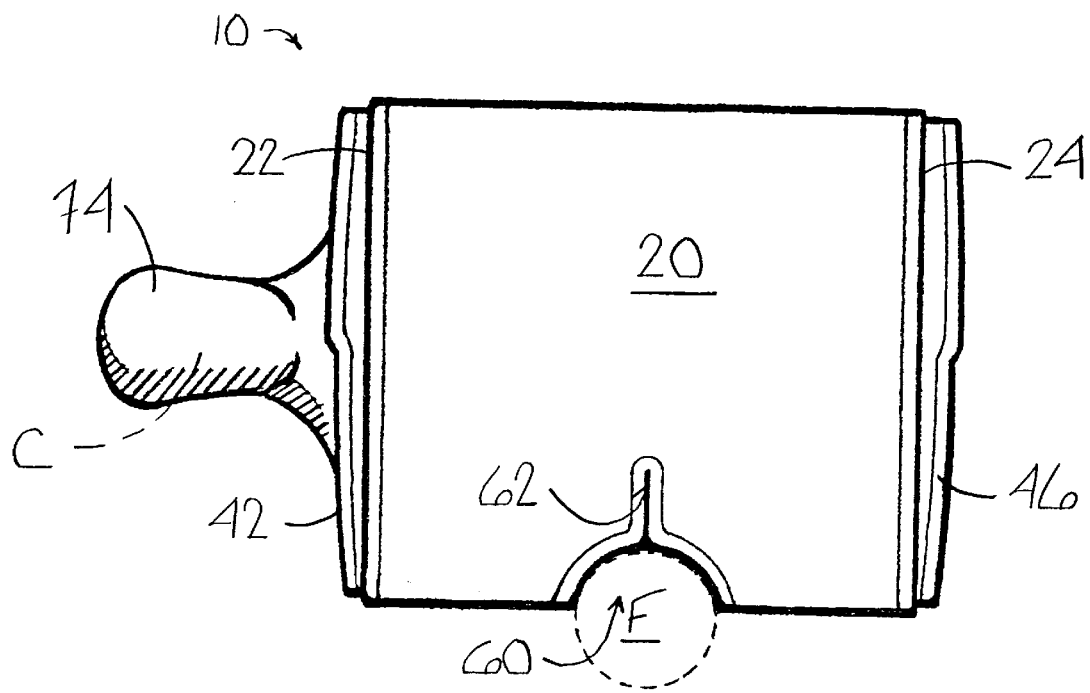
FIG. 3 is an elevational frontal view of the fishing reel cover shown in FIG. 2.
Figure 4:
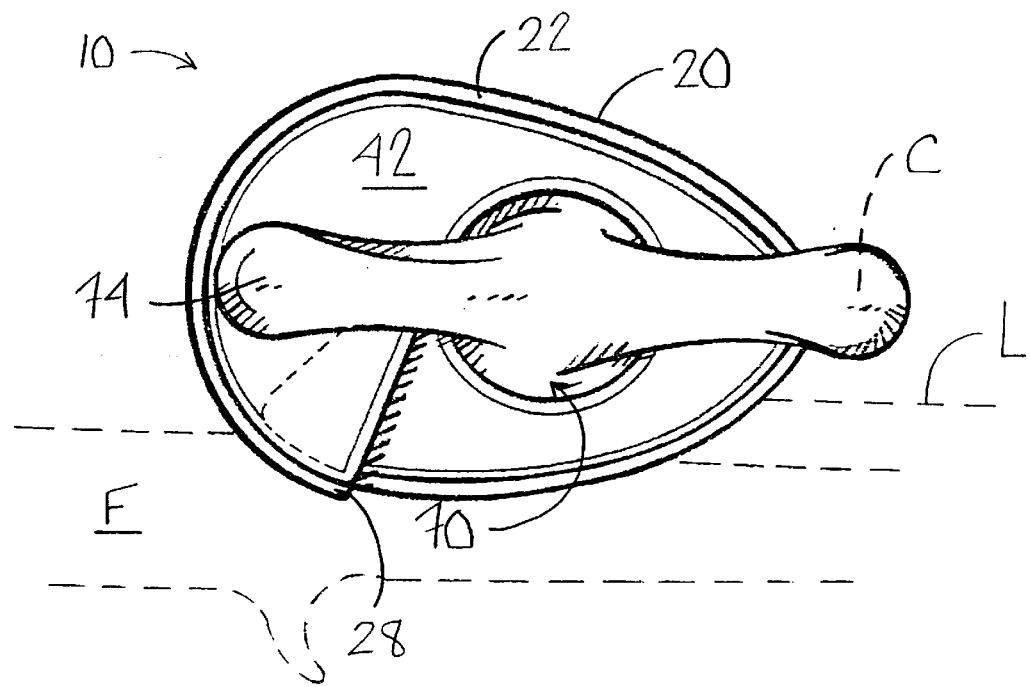
FIG. 4 is an elevational side view of a third embodiment of the fishing reel cover surrounding a low profile bait casting fishing reel fastened to a fishing rod.
Figure 5:
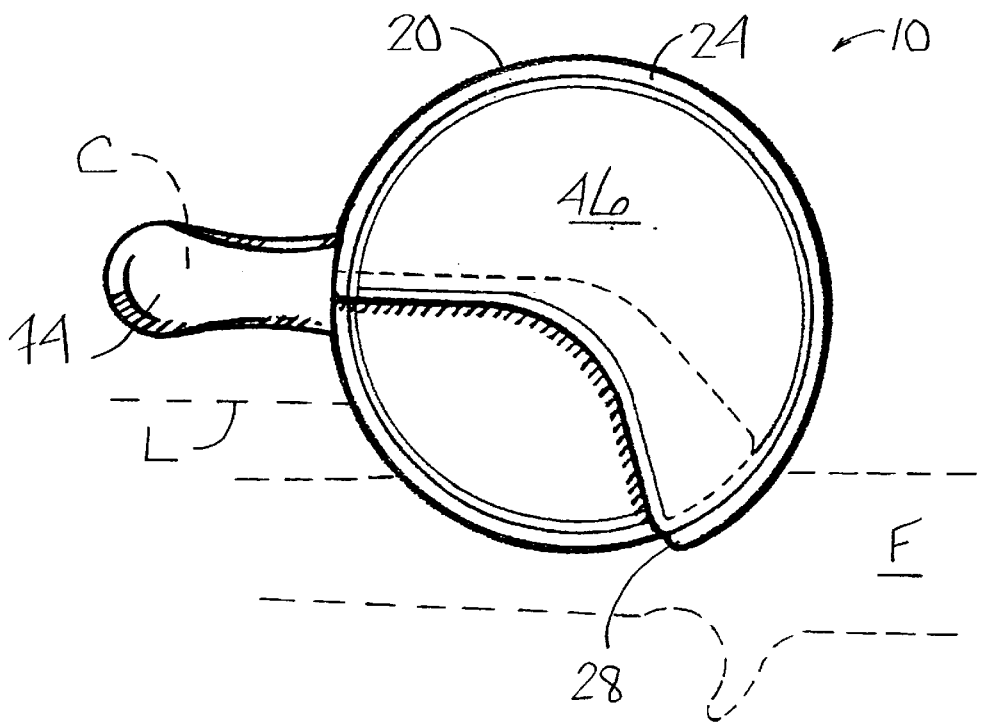
FIG. 5 is an elevational side view of the second end of the fishing reel cover shown in FIG. 2.
Figure 6:
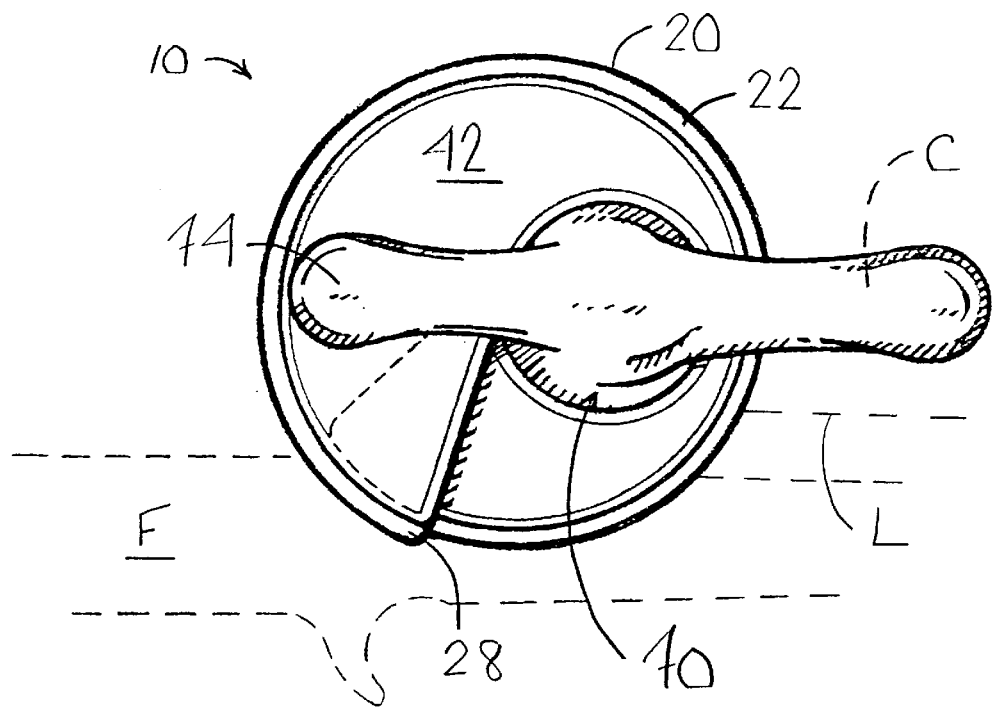
FIG. 6 is an elevational side view of the first end of the fishing reel cover shown in FIG. 2.

Nomenclature
C Fishing Reel Crank
F Fishing Rod
L Fishing Line
R Fishing Reel
10 Fishing Reel Cover
15 Protective Chamber Defined by Fishing Reel Cover
20 Cylindrical Main Body
22 First Side Edge
24 Second Side Edge
26 Longitudinal Slit
28 First End
30 Second End
42 First Endcap
44 Radially Extending Slot in First Endcap
46 Second Endcap
48 Radially Extending Slot in Second Endcap
50 Hook and Loop Fastener Tape
51 Hook Portion of Fastener Tape
52 Loop Portion of Fastener Tape
60 Latitudinal Slot In Main Body Proximate the First End
61 Latitudinal Nock in Main Body Proximate the Second End
62 Latitudinal Slit in Main Body Proximate Distal End of Latitudinal Slot
70 Aperture In First Endcap
72 Lips of Elastomeric Material
74 Pouch of Elastomeric Material Construction Fishing reels (denoted generally as R) contain a spool (unnumbered) for extending and retrieving fishing line (denoted generally as L). The spool may be oriented with the spool axis either perpendicular to or parallel with an attached fishing rod (denoted generally as F). The so called spinning reel employs a parallel spool axis orientation, with the fishing line traveling over one end of the spool. The so called level wind or bait casting reel employs a perpendicular spool axis orientation, with the fishing line traveling over the central body of the spool. Both types of reels have a reel crank (denoted generally as C) oriented perpendicular to the attached rod for rotating the axis of the spool by means of various gear assemblies and thereby extending and retrieving fishing line. Spinning reels are designed with the spool at the top and attached gearing and case generally behind the spool. Bait casting reels are designed with a case surrounding the spool, and the gearing conforming closely to the spool and casing. Spinning reels are available in a variety of shapes from cylindrical to conical, while bait casting reels are generally cylindrical in shape.

The fishing reel cover 10 of the present invention is particularly well suited for use with bait casting reels. Referring generally to FIGS. 1–7, wherein like elements are identified with the same reference characters, a bait casting fishing reel R with a standard crank C is attached to a fishing rod F. The reel cover 10 is of a clam-shell design with a generally cylindrical main body portion 20 having sides enclosed by first and second endcaps 42 and 46 peripherally attached to the first and second side edges 22 and 24 of the main body 20, respectively. The main body 20, along with the endcaps 42 and 46, define a protective chamber 15 for protectively retaining a fishing reel R. The first 42 and second 46 endcaps are attached (e.g., sewn, thermally welded or adhesively bonded) to the main body 20 along the first and second side edges 22 and 24 of the main body 20.

A longitudinal slit 26 extends along the entire longitudinal length of the main body 20 so as to separate the main body 20 and define first and second ends 28 and 30. The endcaps 42 and 46 each have a radially extending slot 44 and 48, respectively, aligned with the longitudinal slit 26 in the main body member 20, so as to permit peripheral movement of the first and second ends 28 and 30 relative to one another. The first and second ends 28 and 30 of the main body 20 may be peripherally repositioned as between an open position, such as shown in FIG. 1, with the first and second ends 28 and 30 peripherally separated for allowing introduction of a fishing reel R into the chamber 15, and a closed position, such as shown in FIGS. 2–7, with the first end 28 overlapping the second end 30 and fastened to the second end 30 by the hook and loop tape 50 for surrounding a fishing reel R retained within the chamber 15. Such peripheral movement of the first and second ends 28 and 30 of the main body 20 facilitates application of the cover 10 around a fishing reel R during transportation and storage, and subsequent removal of the cover 10 from around the fishing reel R prior to use.

A latitudinal slot 60, positioned proximate the longitudinal center of the main body 20, extends peripherally from the first end 28 of the main body 20 for a distance of approximately $\frac{1}{6}^{th}$ to $\frac{1}{3}^{rd}$ of the periphery of the main body 20. The latitudinal slot 60 accomodates passage of the reel cover 10 around the mounting shoe portion (not shown) of the fishing reel R and over the fishing rod F when the cover 10 is used to cover a fishing reel R attached to the fishing rod F.

Similarly, the cover 10 can be provided with a latitudinal nock 61, extending peripherally from the second end 30 of the main body 20 for a distance of approximately 1 to 2 cm and laterally aligned with the latitudinal slot 60, for accommodating the fishing rod F when the cover 10 is used to cover a fishing reel R attached to the fishing rod F.

A latitudinal slit 62 can optionally be provided as a continuation of the latitudinal slot 60 for accommodating passage of fishing line L from a fishing reel R protectively retained within the cover 10.

As shown in FIG. 1, the first and second ends 28 and 30 of the main body 20 can be releasably fastened together by hook and loop fastening tape 50. The configuration shown in FIG. 1 provides a length of the hook portion 51 of the tape 50 secured to either side of the latitudinal slot 60 in the main body 20 proximate the second end 30 of the main body 20 and corresponding lengths of the loop portion 52 of the tape 50 secured to either side of the latitudinal nock 61 in the main body 20 proximate the first end 28 of the main body 20. Other type of releasable fasteners may also be used including specifically, but not exclusively, releasable pressure sensitive adhesives, buttons, hook and eyelet combinations, snaps, string and eyelet combinations, etc.

The radially extending slots 44 and 48 in the end caps 42 and 46 respectively, provide an opening for accommodating extension of the crank C through the cover 10. Since both endcaps 42 and 46 have a slot 44 and 48 respectively, the cover 10 can be readily constructed to accommodate either left or right handed fishing reels R.

As shown in FIGS. 1, 2, 4, 6 and 7, a preferred right handed embodiment of the cover 10 the slot 44 in the first endcap 42 terminates with an enlarged aperture 70 configured and arranged to accommodate passage of the crank C through the first endcap 42. A preferred left handed embodiment provides the aperture 70 through the second endcap 46. As shown in FIG. 7, the aperture may be covered with lips 72 of an elastic material capable of surrounding that portion of the crank C positioned within the aperture 70 in order to sealingly engaged the crank C and prevent the introduction of harmful elements, such as sand, water and saltwater, into the chamber through the aperture 70. The lips 72 may be constructed from any number of suitably elastic materials, including specifically, but not exclusively rubber and knit fabrics. As shown in FIGS. 1–6, an elastic pouch 74 may alternatively be provided over the aperture 70 with an open end (unnumbered) coextensive with the aperture 70 and the pouch 74 configured and arranged to completely enclose the crank C.

The reel cover 10 is preferably made of a water resilient or water repellent material such as treated leather, rubber, canvas, vinyl, nylon, or polyester. The elastomeric pouch 74 is preferably made of rubber or an elastomeric woven fabric.

Use

The reel cover 10 is placed around a fishing reel R by (i) peripherally separating the first and second ends 28 and 30 of the main body 20 so as to open the longitudinal slit 26, (ii) inserting the reel within the protective chamber 15 through the opened longitudinal slit 26, with the reel crank C extending through a radially extending slot 44 or 48 in the corresponding end cap 42 or 46 respectively, and (iii) fastening the first and second ends 28 and 30 of the main body 20 together with the hook and loop fastener tape 50.

The cover 10 may be used to protectively encase the reel R as a separate item, or with the reel R attached to a fishing rod F. The reel mounting shoe (not shown) is accommodated by the latitudinal slot 60 and latitudinal nock 61 in the main body 20 while any attached fishing line L is accommodated by the latitudinal slit 62 in the main body 20. The reel cover 10 may be sized to fit any reel R from a small child's rod and reel set to the larger reels R used for salt water fishing.

While the invention has been particularly shown and described with reference to preferred embodiments thereof, it will be understood by those skilled in the art that various changes in form and details may be made therein without departing from the spirit and scope of the invention.

I claim:

1. A fishing reel cover, comprising:
   (a) a substantially cylindrical main body defining a protective chamber and having (i) first and second side edges (ii) a longitudinal slit defining first and second ends capable of peripheral movement relative to one another, and (iii) a latitudinal slot extending from the first end partially around said cylindrical main body, and terminating with a narrower latitudinal slit;

(b) a first endcap peripherally attached to the first side edge of the main body and having a radially extending slot aligned with the longitudinal slit in the main body;

(c) a second endcap peripherally attached to the second side edge of the main body and having a radially extending slot aligned with the longitudinal slit in the main body; and (d) a means for releasably securing the first and second ends of the main body together;

(e) whereby the first and second ends of the main body may be peripherally moved relative to one another between an open position with the first and second ends peripherally separated for allowing introduction of a fishing reel into the chamber, and a closed position with the first and second ends peripherally proximate one another and attached by the attaching means so as to be effective for protectively surrounding a fishing reel within the chamber.

2. A fishing reel cover according to claim 1 wherein said latitudinal slot is configured and arranged to accommodate passage of the reel cover around a mounting shoe on a fishing reel.

3. A fishing reel cover according to claim 1 wherein the latitudinal slit is configured and arranged to accommodate passage of a fishing line, retained upon a fishing reel within the protective chamber, through the reel cover.

4. A fishing reel cover according to claim 1 further comprising an aperture coextensive with said radially extending slot in a first endcap; the aperture configured and arranged to accommodate passage of a crank portion of a fishing reel, retained within the protective chamber, through the first endcap.

5. A fishing reel cover according to claim 4 further comprising lips of an elastic material covering said aperture for surroundingly engaging a crank extending through the aperture.

6. A fishing reel cover according to claim 1 wherein said releasable securing means comprises hook and loop fastener tape.

7. A fishing reel cover according to claim 1 further comprising an elastomeric pouch having an open end attached to the first endcap substantially coextensive with the aperture in the first endcap; the pouch configured and arranged to be fitted over a crank portion of a fishing reel retained within the protective chamber.

8. A fishing reel cover of claim 1 wherein the main body, first endcap and second endcap are constructed from a water repellent material.

9. A fishing reel cover according to claim 8 wherein said water repellent material is selected from the group consisting of leather, rubber, canvas, vinyl film, vinyl fabric, nylon fabric, and polyester fabric.

* * * * *